US011661006B2

(12) United States Patent
Gali et al.

(10) Patent No.: US 11,661,006 B2
(45) Date of Patent: May 30, 2023

(54) VEHICULAR TRAILERING ASSIST SYSTEM

(71) Applicant: Magna Electronics Inc., Auburn Hills, MI (US)

(72) Inventors: Jyothi P. Gali, Rochester Hills, MI (US); Richard C. Bozich, Canton, MI (US); Mark D. Nelson, Milford, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 39 days.

(21) Appl. No.: 17/031,956

(22) Filed: Sep. 25, 2020

(65) Prior Publication Data

US 2021/0094473 A1 Apr. 1, 2021

Related U.S. Application Data

(60) Provisional application No. 62/906,988, filed on Sep. 27, 2019.

(51) Int. Cl.
*B60R 1/00* (2022.01)
*H04N 5/265* (2006.01)
(Continued)

(52) U.S. Cl.
CPC .............. *B60R 1/003* (2013.01); *H04N 5/265* (2013.01); *H04N 13/111* (2018.05);
(Continued)

(58) Field of Classification Search
None
See application file for complete search history.

(56) References Cited

U.S. PATENT DOCUMENTS 5,670,935 A 9/1997 Schofield et al.
6,498,620 B2 12/2002 Schofield et al.
(Continued)

FOREIGN PATENT DOCUMENTS

WO 2019202317 A1 10/2019
WO 20210127693 A1 6/2021

OTHER PUBLICATIONS

Federal Register, Department of Transportation, Part II, Federal Motor Vehicle Safety StandardsI Rear Visibility; Final Rule, vol. 79, No. 66, Apr. 7, 2014.

*Primary Examiner* — Rebecca A Volentine
(74) *Attorney, Agent, or Firm* — Honigman LLP

(57) ABSTRACT

A vehicular trailering assist system includes a vehicle rear backup camera disposed at a rear portion of a vehicle and viewing at least rearward of the vehicle. A trailer hitched to the vehicle includes a trailer rear camera disposed at a rear portion of the trailer and viewing at least rearward of the trailer. The control displays at a display device in the vehicle a surround view image using an avatar of the vehicle and an avatar of the trailer. The control stitches images derived from image data captured by the vehicle rear backup camera and images derived from the trailer rear camera to provide a transparent trailer view, and the display device displays transparent trailer view video images. Responsive to the vehicle being shifted into a reverse gear, the display device automatically displays rear backup images derived from image data captured by the trailer rear camera.

22 Claims, 7 Drawing Sheets

(51) Int. Cl.
*H04N 13/239* (2018.01)
*H04N 13/111* (2018.01)
*H04N 23/54* (2023.01)

(52) U.S. Cl.
CPC ........... *H04N 13/239* (2018.05); *H04N 23/54* (2023.01); *B60R 2300/105* (2013.01); *B60R 2300/20* (2013.01); *B60R 2300/304* (2013.01); *B60R 2300/60* (2013.01); *B60R 2300/802* (2013.01); *B60R 2300/806* (2013.01); *B60R 2300/8086* (2013.01)

(56) References Cited

U.S. PATENT DOCUMENTS

| | | |
|---|---|---|
| 6,690,268 B2 | 2/2004 | Schofield et al. |
| 9,085,261 B2 | 7/2015 | Lu et al. |
| 9,264,672 B2 | 2/2016 | Lynam |
| 9,446,713 B2 | 9/2016 | Lu et al. |
| 9,558,409 B2 | 1/2017 | Pliefke et al. |
| 10,071,687 B2 | 9/2018 | Ihlenburg et al. |
| 10,086,870 B2 | 10/2018 | Gieseke et al. |
| 10,099,614 B2 | 10/2018 | Diessner |
| 10,160,382 B2 | 12/2018 | Pliefke et al. |
| 10,532,698 B2 | 1/2020 | Potnis et al. |
| 10,552,976 B2 | 2/2020 | Diessner et al. |
| 10,586,119 B2 | 3/2020 | Pliefke et al. |
| 10,638,025 B2 | 4/2020 | Gali et al. |
| 10,706,291 B2 | 7/2020 | Diessner et al. |
| 10,733,757 B2 | 8/2020 | Gupta et al. |
| 10,755,110 B2 | 8/2020 | Bajpai |
| 2014/0063197 A1* | 3/2014 | Yamamoto ............ G06T 15/205 348/46 |
| 2014/0267688 A1* | 9/2014 | Aich ................. B60W 50/0097 348/113 |
| 2015/0002670 A1 | 1/2015 | Bajpai |
| 2016/0049020 A1 | 2/2016 | Kuehnle et al. |
| 2017/0174128 A1 | 6/2017 | Hu et al. |
| 2017/0217372 A1 | 8/2017 | Lu et al. |
| 2017/0254873 A1 | 9/2017 | Koravadi |
| 2017/0280091 A1* | 9/2017 | Greenwood ........ H04N 5/23238 |
| 2017/0341583 A1* | 11/2017 | Zhang ....................... B60R 1/00 |
| 2018/0215382 A1 | 8/2018 | Gupta et al. |
| 2018/0253608 A1 | 9/2018 | Diessner et al. |
| 2018/0276838 A1 | 9/2018 | Gupta et al. |
| 2018/0276839 A1 | 9/2018 | Diessner et al. |
| 2019/0016264 A1 | 1/2019 | Potnis et al. |
| 2019/0039649 A1 | 2/2019 | Gieseke et al. |
| 2019/0042864 A1 | 2/2019 | Pliefke et al. |
| 2019/0064831 A1 | 2/2019 | Gali et al. |
| 2019/0118860 A1 | 4/2019 | Gali et al. |
| 2019/0143895 A1 | 5/2019 | Pliefke et al. |
| 2019/0241126 A1* | 8/2019 | Murad ...................... B60R 1/12 |
| 2019/0329821 A1* | 10/2019 | Ziebart ...................... G06T 7/62 |
| 2019/0347498 A1* | 11/2019 | Herman .................... G06T 7/11 |
| 2019/0347825 A1 | 11/2019 | Gupta et al. |
| 2020/0017143 A1 | 1/2020 | Gali |
| 2020/0334475 A1 | 10/2020 | Joseph et al. |
| 2020/0356788 A1 | 11/2020 | Joseph et al. |
| 2020/0361397 A1 | 11/2020 | Joseph et al. |
| 2020/0406967 A1 | 12/2020 | Yunus et al. |
| 2021/0078634 A1 | 3/2021 | Jalalmaab et al. |
| 2021/0170820 A1 | 6/2021 | Zhang |
| 2021/0170947 A1 | 6/2021 | Yunus et al. |

\* cited by examiner

VEHICULAR TRAILERING ASSIST SYSTEM

CROSS REFERENCE TO RELATED APPLICATION

The present application claims priority of U.S. provisional application Ser. No. 62/906,988, filed Sep. 27, 2019, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicular trailer assist systems is common and known. Examples of such known systems are described in U.S. Pat. Nos. 9,446,713 and 9,085,261, which are hereby incorporated herein by reference in their entireties.

SUMMARY OF THE INVENTION

The present invention provides a vehicular trailer assist or driving assistance system or vision system for a vehicle that utilizes one or more cameras (preferably one or more CMOS cameras) to capture image data representative of images exterior of the vehicle, and provides display of video images derived from image data captured by the vehicle cameras and at least one trailer-mounted camera. The system provides a surround view display of the area around the vehicle and the trailer and/or provides a rear display of the area rearward of the vehicle and trailer for viewing by the driver of the vehicle during a driving maneuver of the vehicle towing the trailer. The system also includes a control comprising an image processor operable to process image data captured by the camera and the image data captured by the camera is representative of the trailer hitched to the vehicle.

The system generates a three dimensional (3D) model for the hitched trailer and, using the 3D model, provides a two dimensional surround view display or a three dimensional surround view display showing avatars of the vehicle and trailer with the trailer avatar being representative of the size and shape (and optionally color) of the trailer being towed. The system may display a transparent trailer view (such as when the vehicle is being driven forward), and when the vehicle is shifted into a reverse gear, the system automatically switches to display of images derived from image data captured by the rearward viewing trailer camera.

These and other objects, advantages, purposes and features of the present invention will become apparent upon review of the following specification in conjunction with the drawings.

DESCRIPTION OF THE PREFERRED EMBODIMENTS

A vehicle and trailer display system or maneuver assist system and/or driving assist system operates to capture images exterior of the vehicle and trailer being towed by the vehicle and may process the captured image data to determine a path of travel for the vehicle and trailer and to detect objects at or near the vehicle and in the predicted path of the vehicle, such as to assist a driver of the vehicle in maneuvering the vehicle and trailer in a rearward direction. The trailer assist system includes an image processor or image processing system that is operable to receive image data from one or more cameras (disposed at the vehicle and disposed at the trailer) and provides an output to a display device for displaying images representative of the captured image data. For example, the trailer assist system may provide display of images derived from the vehicle and trailer cameras, such as a rearview display (showing images of the region rearward of the trailer) and/or a top down or bird's eye or surround view display or the like (showing avatars of the vehicle and trailer and images surrounding the vehicle and trailer).

Figure 1:
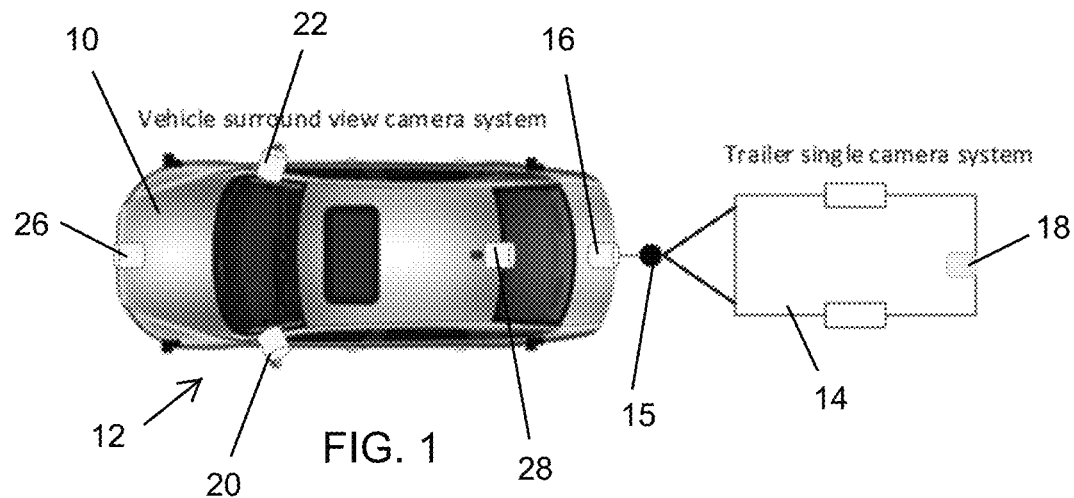
FIG. 1 is a plan view of a vehicle with a trailering assist system that utilizes a plurality of cameras at the vehicle and a rearward viewing camera at the rear of the trailer being towed by the vehicle.

Referring now to the drawings and the illustrative embodiments depicted therein, a vehicle 10 includes a trailer maneuver assist system 12 that is operable to assist in maneuvering (such as backing up or reversing) the vehicle with a hitched trailer 14 hitched to the vehicle at a hitch 15. The trailer maneuver assist system 12 includes a plurality of exterior viewing vehicle-based imaging sensors or cameras 16, 20, 22, including a rearward viewing imaging sensor or camera 16 (and the system may preferably include a sideward/rearward viewing camera 20, 22 at respective sides of the vehicle and a forward viewing camera 26 at the front of the vehicle), which capture image data representative of the scene exterior of the vehicle 10, which includes the trailer 14 (FIG. 1). The trailer 14 includes a rearward viewing camera 18 disposed at a rear of the trailer. The rear trailer camera 18 is disposed at a rear portion of the trailer, such as at the back end of the trailer, with the trailer camera centrally located at the rear portion and having a field of view at least rearward (and downward) at the rear of the trailer. Optionally, a forward viewing camera may be disposed at the windshield of the vehicle 10 and view through the windshield and forward of the vehicle 10, such as for a machine vision system (such as for traffic sign recognition, headlamp control, pedestrian detection, collision avoidance, lane marker detection and/or the like). Optionally, a rearward viewing camera 28 may be disposed higher than the rear backup camera 16 and viewing rearward of the vehicle, such as for a rearward display system of a full mirror display feature. The cameras comprise a lens for focusing images at or onto an imaging array or imaging plane or imager of the camera.

The trailering assist system 12 includes a control or electronic control unit (ECU) at the vehicle for receiving image data captured by the cameras 16, 18. The ECU includes a data processor or image processor that is operable to process image data captured by the camera or cameras and provided to the ECU. The ECU, via processing of the provided image data, may detect objects or the like and/or provide displayed images at a display device for viewing by the driver of the vehicle (the control and/or display device may be part of or incorporated in or at an interior rearview mirror assembly of the vehicle, or the control and/or the display device may be disposed elsewhere at or in the vehicle). The data transfer or signal communication from the cameras (at the vehicle and at the trailer) to the ECU may comprise any suitable data or communication link, such as a vehicle network bus or the like of the equipped vehicle.

The display system is operable to display a 360 degree bird's eye view of the surroundings of the towing vehicle and the trailer connected to it. The display system is also operable to display a trailer see-through image, which shows a rearward and transparent view through the trailer with seamlessly stitching of images and image data captured by the towing vehicle's rear backup camera with images and image data captured by the trailer or satellite camera to provide the rearward video images. The display system is operable to detect or determine or estimate the trailer dimensions required to render both the 360 degree bird's eye view and the trailer see-through view. The system requires minimal effort from the user/driver of the towing vehicle to calibrate the system for the hitched trailer, during which the satellite trailer camera is calibrated, and the trailer dimensions are detected or estimated.

The display system may provide the transparent trailer view display or a two dimensional or three dimensional surround view display, such as responsive to a user actuatable input in the vehicle. The system creates or generates a three dimensional (3D) model for the hitched trailer and, using the 3D model, provides the two dimensional surround view display or the three dimensional surround view display showing avatars of the vehicle and trailer with the trailer avatar being representative of the size and shape (and optionally color) of the trailer being towed. The system may display the transparent trailer view (such as when the vehicle is being driven forward), and when the vehicle is shifted into a reverse gear, the system automatically switches to display of images derived from image data captured by the rearward viewing trailer camera.

The automatic display of rearward images may be in compliance with vehicular use of rearview video systems and in-vehicle visual display in accordance with Federal Motor Vehicle Safety Standard No. 111 (FMVSS 111) as set forth at pages 19178 to 19250 of the Federal Register/Vol. 79, No. 66/Monday, Apr. 7, 2014/Rules and Regulations (which is hereby incorporated herein by reference in its entirety), and optionally in accordance with aspects of the display systems and system disclosure described in U.S. Pat. No. 9,264,672, which is hereby incorporated herein by reference in its entirety. After automatic display of the rearward images (as captured by the rear trailer camera) in a manner compliant with the requirements of FMVSS 111 when the vehicle is shifted into the reverse gear, the operator of the vehicle can select a different display function, such as the surround view function, while the vehicle is still in the reverse gear. Thus, when reverse gear of the transmission system of the vehicle is initially engaged, the field of the view of the rear trailer camera is FMVSS 111 compliant: image size of video images derived from image data captured by the rear trailer camera as displayed at the in-cabin video display screen that is viewable by the driver of the vehicle who is executing the reversing maneuver is FMVSS 111 compliant; response time is FMVSS 111 compliant; linger time is FMVSS 111 compliant; deactivation is FMVSS 111 compliant; default view is FMVSS 111 compliant; and durability is FMVSS 111 compliant.

The system supports all types of trailers including conventional trailers such as but not limited to vehicle haulers, box trailer, utility trailers, loaded and unloaded boat trailer, snow mobiles, and any other custom trailers including fifth wheel or goose neck type of trailers. The system is operable to perform independent of ambient conditions (such as day, night, sunny, cloudy, rain, snow, etc.) and environmental surfaces (such as concrete, asphalt, gravel, grass, dirt, etc.). The system provides views in such a way that there will be no blind spots shown to the user around the towing vehicle and/or the trailer.

Figure 2:
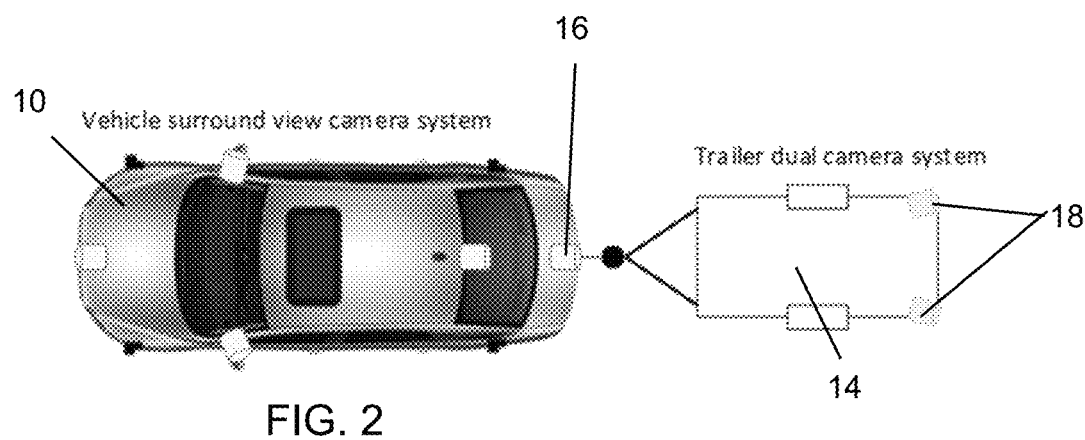
FIG. 2 is a plan view of a vehicle with a trailering assist system that utilizes a plurality of cameras at the vehicle and two rearward viewing cameras at the rear of the trailer being towed by the vehicle.
Figure 3:
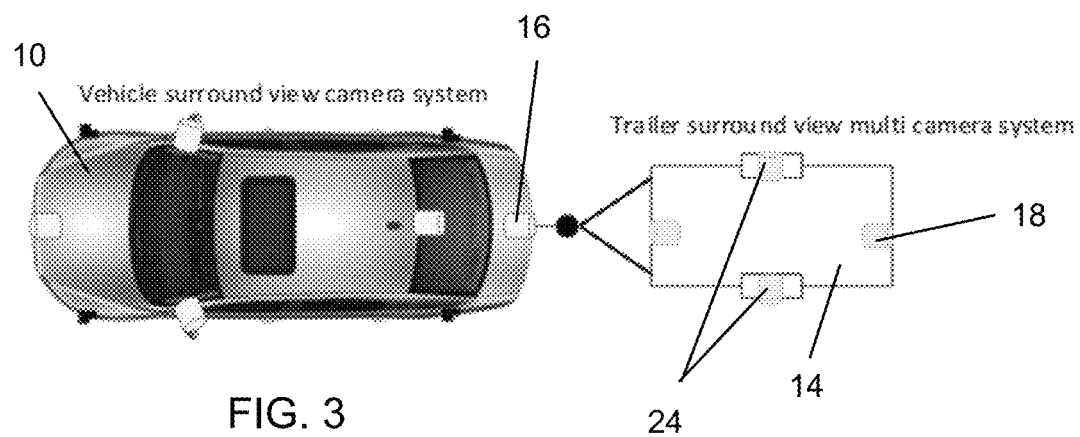
FIG. 3 is a plan view of a vehicle with a trailering assist system that utilizes a plurality of cameras at the vehicle and a plurality of cameras at the trailer being towed by the vehicle.

The display system, in order to provide the desired surround view images and the rearward see-through or transparent trailer images, requires four surround view cameras at the towing vehicle, each preferably comprising a wide angle camera having at least 180 degrees of horizontal field of view and at least 90 degrees of vertical field of view, and at least one rearward viewing trailer or satellite camera (such as shown in FIG. 1) or two rearward viewing trailer or satellite cameras (such as shown in FIG. 2) or a plurality of surround view trailer cameras (such as shown in FIG. 3), with each trailer or satellite camera preferably comprising a wide angle camera having at least 180 degrees of horizontal field of view and at least 90 degrees of vertical field of view. The cameras may be monocular, binocular or stereoscopic vision based. The system receives vehicle CAN signals, such as but not limited to vehicle speed, steering angle, gear ratio, etc.

The system may determine that a trailer is hitched at the vehicle, such as by detecting presence of the trailer via image processing of image data captured by the vehicle rear backup camera, or such as responsive to electrical connection of the trailer wire harness to the vehicle wire harness, or such as responsive to receiving a signal from the trailer camera, or such as responsive to actuation of a user input by the driver of the vehicle. Responsive to determination that the trailer is hitched at hitch of the vehicle, the system may determine that the trailer has previously been hitched to the vehicle (whereby the trailer parameters of that trailer may already be determined and saved or stored in memory) or that the trailer has not previously been hitched to the vehicle or has not been previously identified by the system (whereby the system may enter a calibration mode or learning mode to determine the parameters of the trailer), as discussed below.

Figure 4:
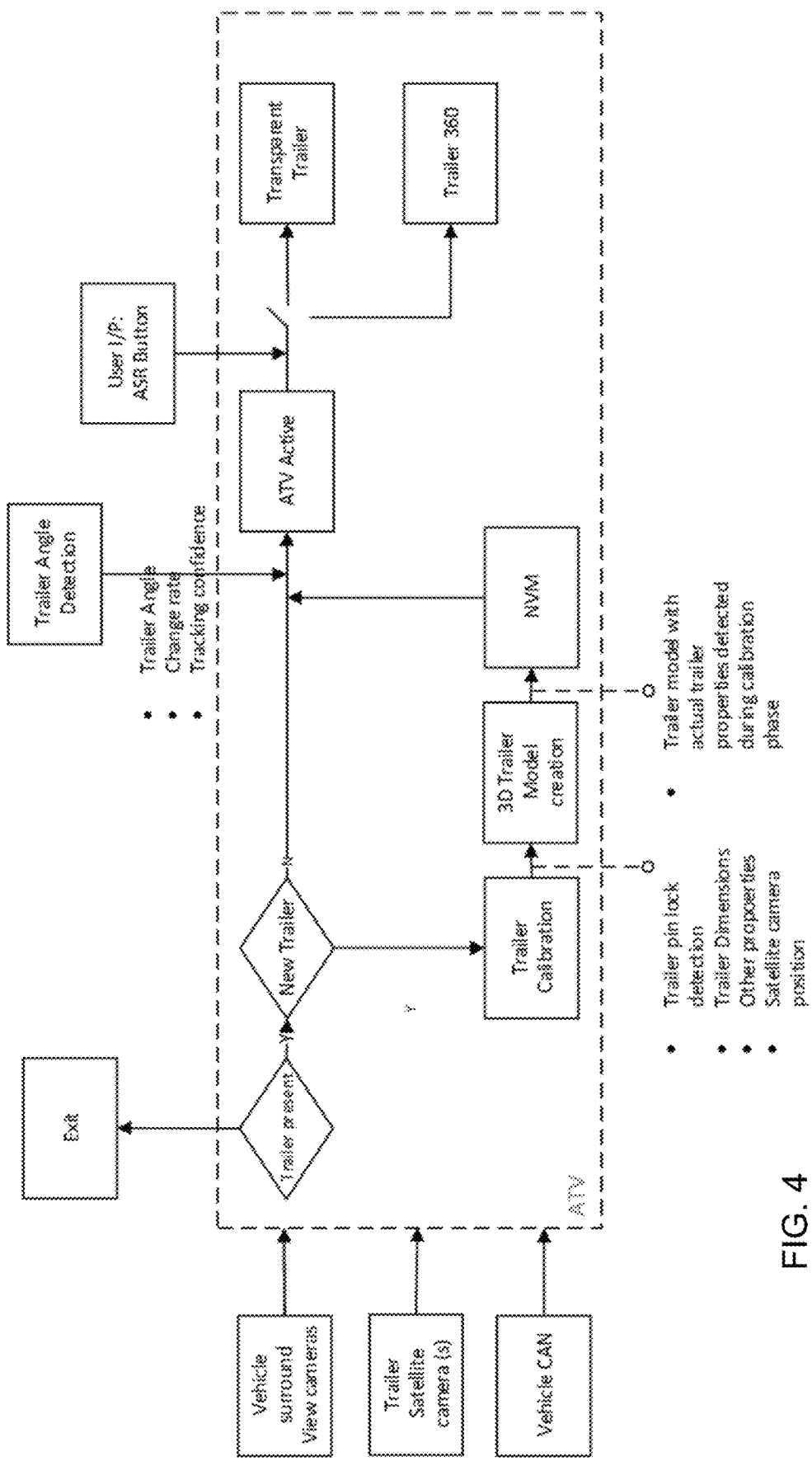
FIG. 4 is a block diagram of the trailering assist system.
Figures 5, 6:
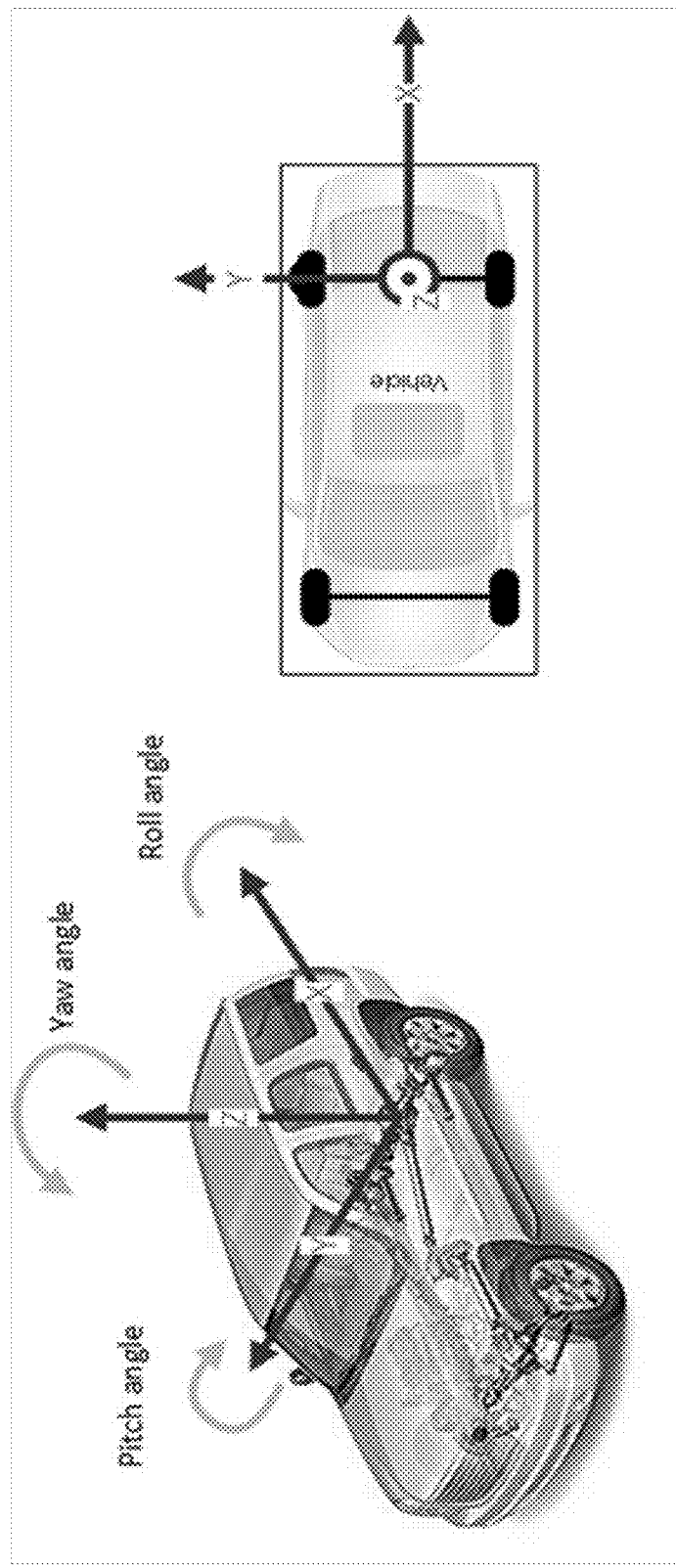
FIG. 5 is a perspective view of a towing vehicle, showing the yaw, pitch and roll angles of the vehicle.
FIG. 6 is a top plan view of the vehicle of FIG. 5.

As shown in FIG. 4, the system receives image data from the vehicle surround view cameras, the trailer satellite camera(s) and the vehicle CAN bus. If the system determines that a trailer is hitched to the vehicle and that the hitched trailer is a new trailer (not before identified by the system), the system enters a trailer calibration mode and generates a three dimensional trailer model (such as via determination of trailer dimensions, satellite camera position, trailer pin lock detection, etc.), so that the system has a trailer model with actual trailer properties detected or determined or estimated during the calibration phase.

Figure 12A:
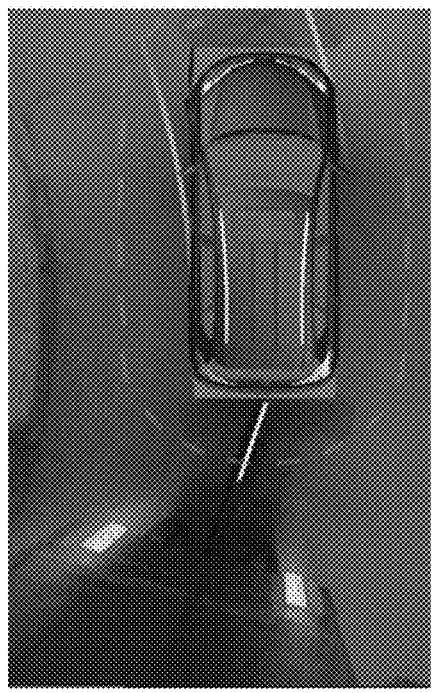
FIG. 12A is a surround view display image showing the vehicle with the image of the trailer being large and distorted.
Figure 12B:
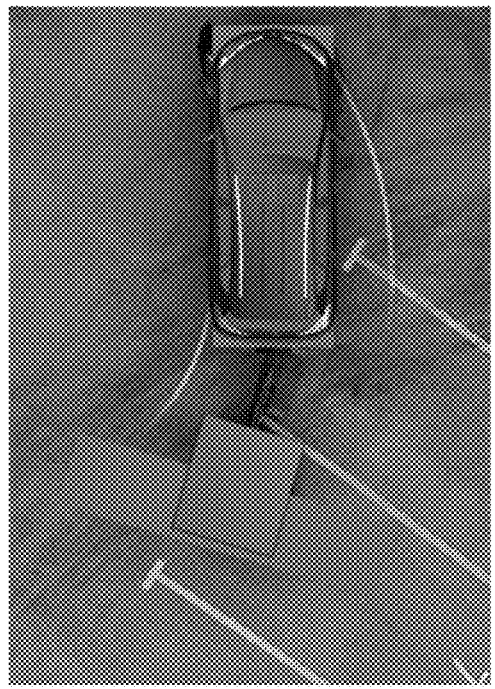
FIG. 12B is a surround view display image showing the vehicle with the image of the trailer as derived using a 3D model.
Figure 13A:
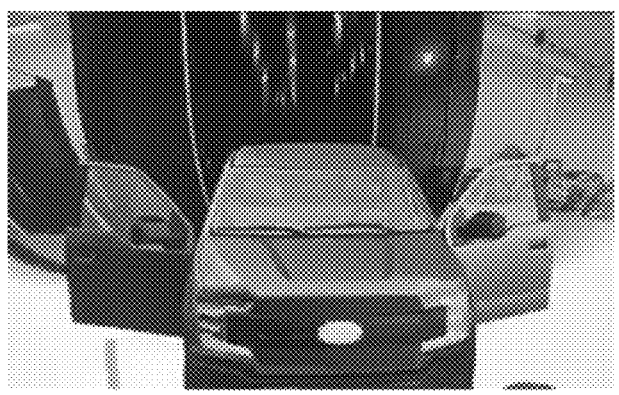
FIG. 13A is a rear view display image showing the vehicle with the image of the trailer being large and distorted.
Figure 13B:
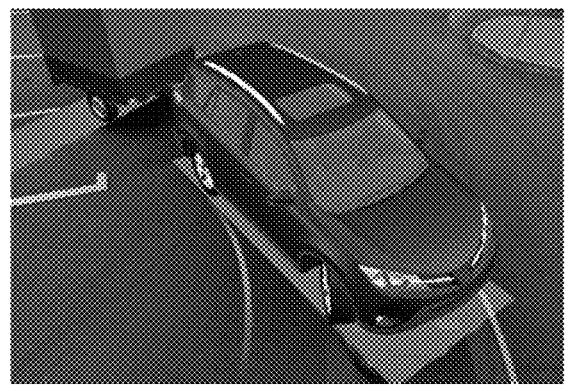
FIG. 13B is a rear view display image showing the vehicle with the image of the trailer as derived using a 3D model.
Figure 14:
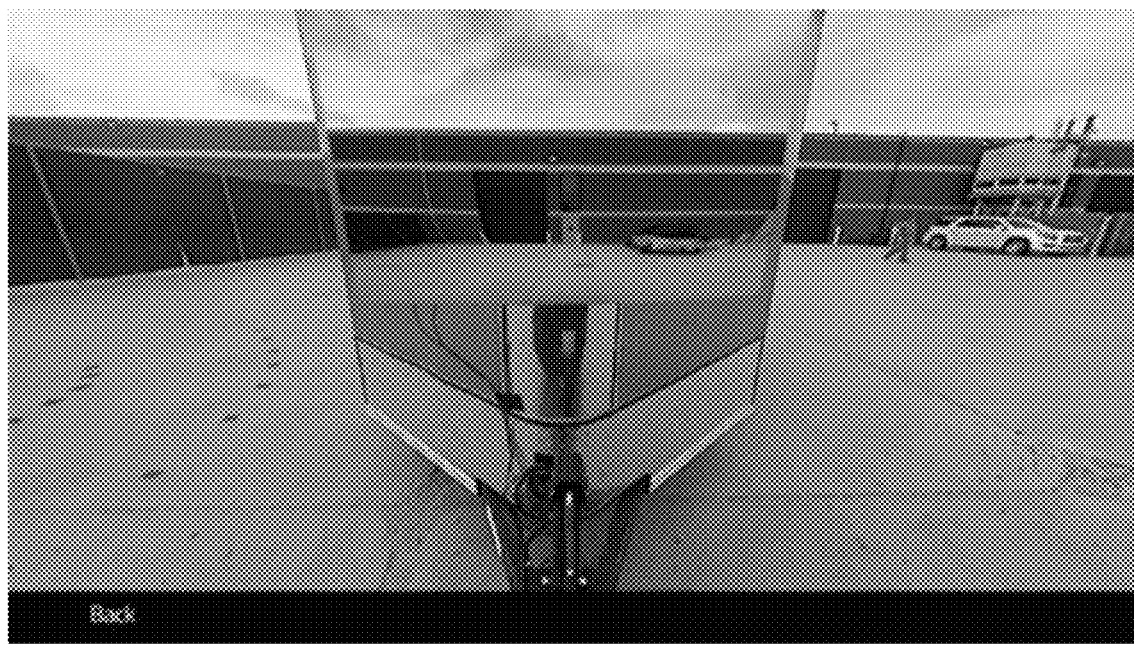
FIG. 14 is a displayed image rearward of the vehicle showing the trailer in a see-through trailer display mode.
Figure 15:
FIG. 15 is another displayed image rearward of the vehicle showing the trailer in the see-through trailer display mode.

The system, when the trailer view display system is active, and such as responsive to actuation of a user input, may provide a transparent trailer view as the vehicle travels along the road (such as in the forward direction), whereby the displayed images are derived from the rear vehicle camera (e.g., the vehicle's backup camera or a higher mounted rearward viewing camera of the vehicle) and the rear viewing trailer camera, so that the trailer appears transparent in the displayed images (such as shown in FIGS. 14 and 15). Responsive to actuation of a user input, the system may operate in the trailer 360 surround view mode, whereby surround view images are displayed based on the vehicle and trailer cameras, and based on the determined 3D model of the trailer, such that the vehicle and trailer can be shown as avatars of the appropriate size and shape in the surround view images (such as shown in FIGS. 12B and 13B).

The user can activate the advanced trailer views feature anytime while the towing vehicle is on and towing a trailer. However, whenever the shift position of the towing vehicle is moved to reverse gear, the display system will display the standard rear backup camera view as per the FMVSS 111 standard. For example, the system may function to display the transparent trailer view when the vehicle is being driven forward along a road, and, when the vehicle is shifted into reverse gear, the display system automatically changes the displayed images to be images derived from the image data captured by the rearward viewing trailer camera.

When the advanced trailer views (ATV) display system is activated on a towing vehicle, the system detects connection of a trailer to the towing vehicle, such as by processing of image data captured by the rear backup camera of the towing vehicle and the vehicle's CAN data. The system automatically recognizes if the connected trailer is already been calibrated or not. If the hitched trailer is a calibrated trailer, the system allows the user/drive of the towing vehicle to use the ATV features. If the hitched trailer is a new trailer, the system guides the user to calibrate the trailer. The calibration phase comprises a one-time learning phase for the display system for each new trailer, where the system determines or estimates dimensions of the hitched trailer, color and shape of the hitched trailer, and the physical position of the satellite camera on the trailer.

Figure 7:
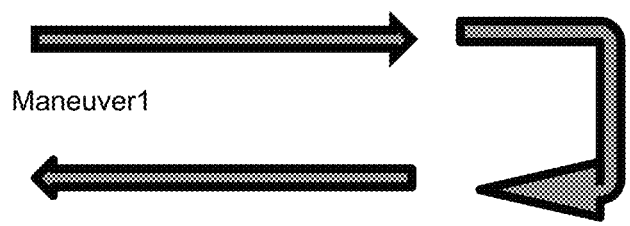
FIG. 7 is a schematic showing an exemplary calibration maneuver for the vehicle and trailer when calibrating the system for a new trailer hitched at the vehicle.
Figure 8:
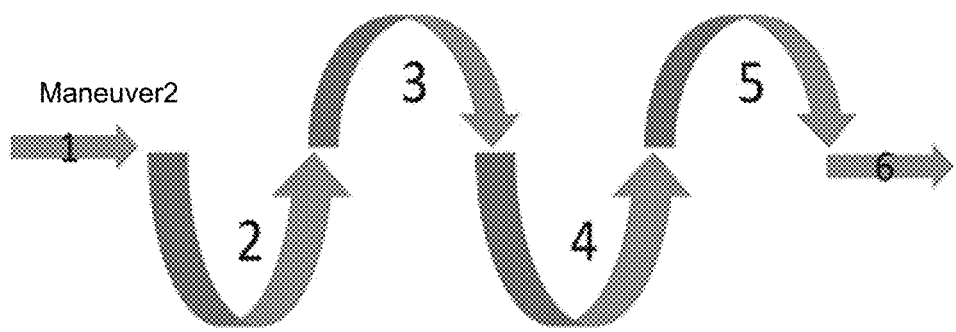
FIG. 8 is a schematic showing another exemplary calibration maneuver for the vehicle and trailer when calibrating the system for a new trailer hitched at the vehicle.
Figure 9:
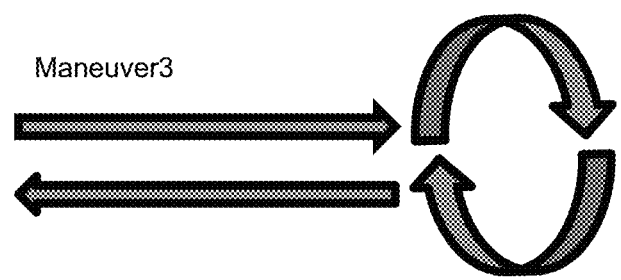
FIG. 9 is a schematic showing another exemplary calibration maneuver for the vehicle and trailer when calibrating the system for a new trailer hitched at the vehicle.
Figure 10:
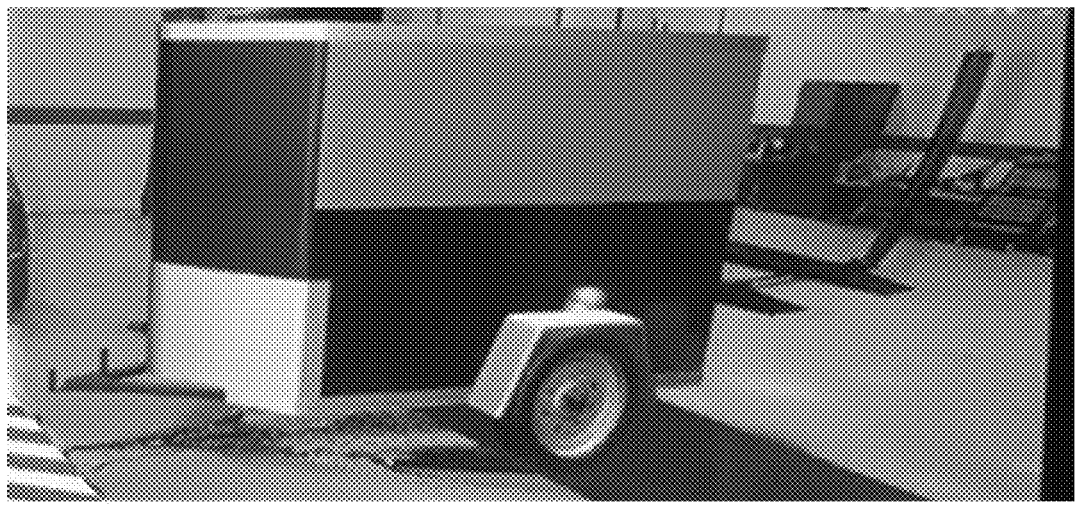
FIG. 10 is a perspective view of a trailer suitable for use with the trailering assist system.
Figure 11:
FIG. 11 is a perspective view of a vehicle towing a trailer.

The system may, when calibrating the system and trailer, request that the driver maneuver the vehicle and trailer along a driving maneuver that allows the system to determine or estimate the trailer dimensions and parameters, whereby the driver must perform the requested driving maneuver. As shown in FIGS. 7-9, the driving maneuver may comprise driving the vehicle and trailer in a straight line and making one or more turns in forward direction (or in reverse direction). The required maneuver may comprise driving the vehicle and trailer straight, whereby, at the beginning of the straight drive, the system detects the connection of the trailer to towing vehicle and confirms that the hitch is locked with the safety pin in place. The system checks if the tailgate is down, and provides a warning if it is. At the end of driving straight maneuver, the system detects the trailer from the background.

During turning maneuvers, the system detects the trailer and estimates dimensions of the trailer (such as but not limited to length, width, height, tongue length, trailer jack position and shape, wheel radius), and may determine other properties of the trailer (such as color, shape of trailer including shape of trailer tongue, trailer jack). The system also determines the physical position of the trailer satellite camera(s) on the trailer (such as extrinsic camera angles and displacement with reference to a datum point of the towing vehicle).

The system detects the color of the trailer using image data captured by the rear backup camera and/or image data captured by the side cameras of the towing vehicle. The system determines the trailer dimensions, including the trailer length or distance between the center of the trailer hitch or coupler to the rear end of the trailer along the X-axis. The system detects or estimates the length of the trailer using image data from the towing vehicle's surround view camera system only or using image data from both the towing vehicle camera(s) and the trailer rear camera or trailer surround view camera systems.

The system determines other trailer dimensions, including the trailer width or the maximum body dimensions of the trailer along the Y-axis. The system detects or estimate the width of the trailer using image data captured by the towing vehicle's surround view camera system.

The system also determines the trailer height dimension or distance between the ground plane and a top end of the trailer along the Z-axis. The system detects or estimates the height of the trailer using image data captured by the towing vehicle's surround view camera system only or using image data captured by both the towing vehicle surround view cameras and the trailer rear camera or trailer surround view camera systems.

The system also determines the trailer tongue length or the distance between the trailer hitch or coupler and the start of the body of the trailer along the X-axis. The system detects or estimates the length of the trailer tongue using image data captured by the rear backup camera of the towing vehicle.

The system also determines the trailer beam length or the distance between the trailer hitch or coupler and the center of the axle or axles of the trailer along the X-axis. The system estimates the beam length of the trailer tongue using image data captured by the rear backup camera of the towing vehicle and by measuring kinematics using vehicle CAN data, or optionally, the system may estimate the beam length of the trailer tongue using image data captured by the rear backup camera and one/both side view cameras of the towing vehicle.

The system also determines the trailer wheel properties such as tire and wheel circumferences, wheel fender size and the like. The system estimates the trailer wheel properties using image data captured by the vehicle rear backup camera and one/both side view cameras of the towing vehicle.

After the calibration driving maneuver, and based on the detected/estimated dimensions and other properties of the trailer, the system generates a three dimensional (3D) model of the trailer. The 3D trailer model created by the system resembles the actual trailer. The 3D trailer model is stored in the memory for the future use. In situations where the same trailer is hitched to the vehicle, the 3D model from the memory is loaded instead of creating it every time (so that future uses of the trailer and display system will not require any calibration drive).

The system uses the 3D trailer model in place of the actual trailer position and aligns/stiches the vehicle surround view with trailer surround view or trailer rear satellite camera(s). The system shows a top horizontal surface (for example for a boat) to confirm the "load" is properly aligned on the trailer. The system determines parking structure height (front camera view while in drive) and trailer height, and may generate an alert or warning to the driver of the vehicle when the trailer is too tall for a structure height that the vehicle and trailer is approaching. The system analyzes the positions of the four trailer satellite cameras to establish a go/no-go installation for stitching.

The system uses the 3D model in place of the actual trailer images and gives an advantage of seamless stitching between the towing vehicle camera system and the trailer camera system. When the trailer is connected, the trailer (as viewed by the vehicle's wide angle cameras) looks a like a large balloon in the 2D and 3D surround view system (see FIGS. 12A and 13A), because of the distortion caused by the trailer which is near to rear backup camera of the towing vehicle. This distorted display is avoided by using the 3D model of the trailer in the 2D and 3D surround views (see FIGS. 12B and 13B). Thus, as shown in FIG. 12A, the trailer is shown as a large distorted trailer in the 2D surround view image, but as shown in FIG. 12B, the trailer is shown as an avatar having the estimated dimensions based on the 3D model of the trailer. Similarly, as shown in FIG. 13A, the actual trailer image in the 3D surround view of the towing vehicle (with the towing vehicle shown as an avatar) appears like a large balloon due to the distortion in the captured images, but as shown in FIG. 13B, the trailer is shown as a three dimensional avatar having the estimated dimensions based on the 3D model of the trailer.

After the completion of the calibration driving maneuver (s), the system has the knowledge about the position(s) of trailer camera(s). To provide the transparent trailer view, the system requires at least one satellite camera at the rear end of the trailer. There is no restriction for the placement of the satellite camera(s) on the trailer. To support the transparent trailer view at larger trailer angles, the system may require at least two cameras on the trailer, such as two cameras at the rear end of the trailer (such as shown in FIG. 2), or one at rear end of the trailer and another side camera at each side of the trailer (such as shown in FIG. 3) for capturing image data at the side of the trailer toward which the trailer is angling.

The transparent trailer view aligns the images captured by the rear (and/or side) satellite camera(s) on the trailer with images captured by the rear back up camera of the vehicle. The transparent trailer view display avoids the blind spots created by the trailer. Although the camera systems on the towing vehicle and trailer may have cameras at different heights, by adjusting the heights and other extrinsic parameters of the virtual cameras, the alignment would be established between them. The transparent trailer view allows the driver to compare trailer views while in drive to check for trailer sway, and the system may provide a driver alert or warning when the trailer sway exceeds a threshold level.

Thus, the system may provide a transparent trailer view using image data captured by at least the vehicle rear backup camera and the trailer rear camera, whereby the captured image data is combined and stitched to provide panoramic rearward view displayed images of the area rearward of the vehicle and rearward of the trailer, with at least the trailer body shown as transparent. Optionally, and either in addition to the vehicle rear backup camera or as a supplement to the vehicle rear backup camera, a driver-side (left side) side camera 20 (FIG. 1) can be mounted at a driver-side (left side) portion of the vehicle with its field of view at least sideward and to the rear of the vehicle, and a passenger-side (right side) side camera 22 (FIG. 1) can be mounted at a passenger-side (right side) portion of the vehicle with its field of view at least sideward and to the rear of the vehicle. Image data captured by all of the vehicle driver-side side camera, the vehicle passenger-side side camera, the vehicle rear backup camera and the trailer rear camera can be merged to form a seamless panoramic view rearward, with the trailer shown as a transparent trailer. Such combination optionally may include the methods and aspects of the systems described in U.S. Pat. No. 6,498,620 and/or 5,670,935, which are hereby incorporated herein by reference in their entireties. Similarly, when the trailer is equipped with side cameras 24 (FIG. 3), image data captured by all of the vehicle driver-side side camera, the vehicle passenger-side side camera, the vehicle rear backup camera, the trailer side cameras and the trailer rear camera can be merged to form a seamless panoramic view rearward, with the trailer shown as a transparent trailer. Such combinations of image data can also be used to provide the surround view images of the areas surrounding the vehicle and trailer (and showing the vehicle avatar and trailer avatar).

Optionally, the vehicle driver-side side camera and the vehicle passenger-side side camera may be incorporated as part of respective driver-side and passenger-side rearview mirror assemblies. Alternatively, when the vehicle is equipped with a surround vision system comprising a forward viewing camera (preferably disposed behind and viewing through the windshield), at least one side/rear viewing camera mounted at the driver side of the vehicle, at least one side/rear viewing camera mounted at the passenger side of the vehicle, and at least one rear viewing camera mounted at a rear portion of the vehicle, image data captured by the surround vision cameras can be used by the display system to display the transparent trailer images and/or the surround view images of the vehicle and trailer.

Optionally, the display screen may be disposed at an interior rearview mirror assembly of the vehicle, and may comprise a full view mirror display or dual-mode interior rearview video mirror that can switch from a traditional reflection mode to a live-video display mode, such as by utilizing aspects of the mirror and display systems described in U.S. Pat. Nos. 10,442,360; 10,421,404; 10,046,706 and/or 10,029,614, and/or U.S. Publication Nos. US-2019-0258131; US-2019-0146297; US-2019-0118717 and/or US-2017-0355312, and/or U.S. provisional applications, Ser. No. 62/942,351, filed Dec. 2, 2019, Ser. No. 62/941,089, filed Nov. 27, 2019, and/or Ser. No. 62/942,305, filed Dec. 2, 2019, which are all hereby incorporated herein by reference in their entireties. When the mirror display is activated to display the rearward images captured by the vehicle rear camera (such as a high mounted rear camera 28, such as shown in FIG. 1), and with the trailer hitched to the vehicle, the rearward images displayed at the mirror are derived from the trailer rear camera 18 instead of the vehicle rear camera.

The trailering assist system may utilize aspects of the trailering assist systems or trailer angle detection systems or trailering hitch assist systems described in U.S. Pat. Nos. 10,638,025; 10,160,382; 10,086,870; 9,558,409; 9,446,713; 9,085,261 and/or 6,690,268, and/or U.S. Publication Nos. US-2020-0017143; US-2019-0347825; US-2019-0118860; US-2019-0064831; US-2019-0042864; US-2019-0039649; US-2019-0143895; US-2019-0016264; US-2018-0276839; US-2018-0276838; US-2018-0253608; US-2018-0215382; US-2017-0254873; US-2017-0217372 and/or US-2015-0002670, and/or U.S. patent application Ser. No. 16/946,542, filed on Jun. 26, 2020, Ser. No. 15/929,646, filed May 14, 2020; Ser. No. 15/929,535, filed on May 8, 2020, and/or Ser. No. 16/850,300, filed on Apr. 16, 2020, which are all hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

Optionally, the system may include a display for displaying images captured by one or more of the imaging sensors for viewing by the driver of the vehicle while the driver is normally operating the vehicle. Optionally, for example, the system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252 and/or 6,642,851, and/or U.S. Publication Nos. US-2014-0022390; US-2012-0162427; US-2006-0050018 and/or US-2006-0061008, which are all hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular trailering assist system, the vehicular trailering assist system comprising:
a vehicle rear backup camera disposed at a rear portion of a vehicle and viewing at least rearward of the vehicle, wherein, with a trailer hitched at a hitch of the vehicle, the vehicle rear backup camera views a portion of the trailer hitched at the hitch of the vehicle;

wherein the trailer comprises a trailer rear camera disposed at a rear portion of the trailer and viewing at least rearward of the trailer;

a control comprising an image processor for processing image data captured by the vehicle rear backup camera and image data captured by the trailer rear camera;

a display device disposed in the vehicle and operable to display video images at a display screen that is viewable by a driver of the vehicle;

wherein the control, with the trailer hitched at the hitch of the vehicle, generates a three dimensional model of the trailer that is representative of length, width and height of the trailer;

wherein the control, with the trailer hitched at the hitch of the vehicle, and responsive to actuation of a user actuatable input, displays a surround view image using a vehicle avatar of the vehicle and a trailer avatar of the trailer derived from the three dimensional model of the trailer, and wherein three dimensions of the trailer avatar are visible when displayed, and wherein the visible three dimensions of the trailer avatar represent length, width, and height of the trailer, and wherein three dimensions of the vehicle avatar are visible when displayed, and wherein the three visible dimensions of the vehicle avatar represent length, width, and height of the vehicle;

wherein the control, with the trailer hitched at the hitch of the vehicle, and responsive to actuation of the user actuatable input, displays transparent trailer view video images derived from image data captured by a rearward viewing vehicle camera and the trailer rear camera, and wherein the control, when displaying the transparent trailer view video images, overlays at least a portion of images derived from image data captured by the trailer rear camera over a first portion of images derived from image data captured by the rearward viewing vehicle camera to provide transparent trailer views, and wherein a second portion of the images derived from image data captured by the rearward viewing vehicle camera is not overlayed by the at least a portion of images derived from image data captured by the trailer rear camera, and wherein the second portion of the images derived from image data captured by the rearward viewing vehicle camera that are not overlayed by the at least a portion of images derived from image data captured by the trailer rear camera include a portion of the trailer in the images derived from image data captured by the rearward viewing vehicle camera, and wherein the display device displays the transparent trailer view video images based on the provided transparent trailer views; and wherein, with the trailer hitched at the hitch of the vehicle, and responsive to the vehicle being shifted into a reverse gear, the display device automatically displays rear backup images derived from image data captured by the trailer rear camera.

2. The vehicular trailering assist system of claim 1, comprising a plurality of trailer cameras disposed at the trailer, wherein the plurality of trailer cameras includes the trailer rear camera and at least one trailer side camera mounted at each side of the trailer and viewing at least sideward of the trailer.

3. The vehicular trailering assist system of claim 2, wherein the displayed transparent trailer view images are derived from image data captured by at least one of the trailer side cameras.

4. The vehicular trailering assist system of claim 3, wherein the displayed transparent trailer view images are derived from image data captured by at least one other vehicle camera disposed at the vehicle and viewing at least rearward and sideward of the vehicle.

5. The vehicular trailering assist system of claim 1, comprising a plurality of vehicle cameras disposed at the vehicle.

6. The vehicular trailering assist system of claim 5, wherein the control generates the three dimensional model by estimating length, width and height dimensions responsive to processing of image data captured by at least some of the plurality of vehicle cameras disposed at the vehicle.

7. The vehicular trailering assist system of claim 5, wherein, with the trailer hitched at the hitch of the vehicle, the trailer avatar has a color derived from determination of the color of the trailer via processing of image data captured by at least some of the plurality of vehicle cameras disposed at the vehicle.

8. The vehicular trailering assist system of claim 1, wherein, with the trailer hitched at the hitch of the vehicle, and responsive to determining that the trailer is hitched to the vehicle for the first time, the control generates the three dimensional model during a calibration drive.

9. The vehicular trailering assist system of claim 1, wherein the control stores the generated three dimensional model of the trailer that is currently hitched to the hitch of the vehicle for use in future events where that trailer is hitched to the hitch of the vehicle.

10. The vehicular trailering assist system of claim 1, wherein, with the trailer hitched at the hitch of the vehicle, the trailer avatar has a color derived from determination of the color of the trailer via processing of image data captured by the vehicle rear backup camera disposed at the rear portion of the vehicle.

11. The vehicular trailering assist system of claim 1, wherein the rearward viewing vehicle camera comprises the vehicle rear backup camera.

12. A vehicular trailering assist system, the vehicular trailering assist system comprising:

a vehicle rear backup camera disposed at a rear portion of a vehicle and viewing at least rearward of the vehicle, wherein, with a trailer hitched at a hitch of the vehicle, the vehicle rear backup camera views a portion of the trailer hitched at the hitch of the vehicle;

wherein the trailer comprises a trailer rear camera disposed at a rear portion of the trailer and viewing at least rearward of the trailer;

a control comprising an image processor for processing image data captured by the vehicle rear backup camera and image data captured by the trailer rear camera;

a display device disposed in the vehicle and operable to display video images at a display screen that is viewable by a driver of the vehicle;

wherein the control, with the trailer hitched at the hitch of the vehicle, generates a three dimensional model of the trailer that is representative of length, width and height of the trailer;

wherein the control, with the trailer hitched at the hitch of the vehicle, and responsive to actuation of a user actuatable input, displays a surround view image using a vehicle avatar of the vehicle and a trailer avatar of the trailer derived from the three dimensional model of the trailer, and wherein three dimensions of the trailer avatar are visible when displayed, and wherein the visible three dimensions of the trailer avatar represent length, width, and height of the trailer, and wherein three dimensions of the vehicle avatar are visible when displayed, and wherein the three visible dimensions of the vehicle avatar represent length, width, and height of the vehicle;

wherein, with the trailer hitched at the hitch of the vehicle, the trailer avatar has a color derived from determination of the color of the trailer via processing of image data captured by the vehicle rear backup camera disposed at the rear portion of the vehicle;

wherein the control stores the generated three dimensional model of the trailer that is currently hitched to the hitch of the vehicle for use in future events where that trailer is hitched to the hitch of the vehicle;

wherein the control, with the trailer hitched at the hitch of the vehicle, and responsive to actuation of the user actuatable input, displays transparent trailer view video images derived from image data captured by a rearward viewing vehicle camera and the trailer rear camera, and wherein the control, when displaying the transparent trailer view video images, overlays at least a portion of images derived from image data captured by the trailer rear camera over a first portion of images derived from image data captured by the rearward viewing camera to provide transparent trailer views, and wherein a second portion of the images derived from image data captured by the rearward viewing camera is not overlayed by the at least a portion of images derived from image data captured by the trailer rear camera, and wherein the second portion of the images derived from image data captured by the rearward viewing vehicle camera that are not overlayed by the at least a portion of images derived from image data captured by the trailer rear camera include a portion of the trailer in the images derived from image data captured by the rearward viewing vehicle camera, and wherein the display device displays the transparent trailer view video images based on the provided transparent trailer views; and wherein, with the trailer hitched at the hitch of the vehicle, and responsive to the vehicle being shifted into a reverse gear, the display device automatically displays rear backup images derived from image data captured by the trailer rear camera.

13. The vehicular trailering assist system of claim 12, comprising a plurality of trailer cameras disposed at the trailer, wherein the plurality of trailer cameras includes the trailer rear camera and at least one trailer side camera mounted at each side of the trailer and viewing at least sideward of the trailer.

14. The vehicular trailering assist system of claim 13, wherein the displayed transparent trailer view images are derived from image data captured by at least one of the trailer side cameras.

15. The vehicular trailering assist system of claim 12, comprising a plurality of vehicle cameras disposed at the vehicle.

16. The vehicular trailering assist system of claim 15, wherein the control generates the three dimensional model by estimating length, width and height dimensions responsive to processing of image data captured by at least some of the plurality of vehicle cameras disposed at the vehicle.

17. A vehicular trailering assist system, the vehicular trailering assist system comprising:

a plurality of vehicle cameras disposed at the vehicle;

wherein the plurality of vehicle cameras comprises at least (i) a vehicle rear backup camera disposed at a rear portion of a vehicle and viewing at least rearward of the vehicle, (ii) a vehicle left-side camera disposed at a left side of the vehicle and viewing at least sideward and rearward of the vehicle and (iii) a vehicle right-side camera disposed at a right side of the vehicle and viewing at least sideward and rearward of the vehicle;

wherein, with a trailer hitched at a hitch of the vehicle, at least the vehicle rear backup camera views a portion of the trailer hitched at the hitch of the vehicle;

wherein the trailer comprises a trailer rear camera disposed at a rear portion of the trailer and viewing at least rearward of the trailer;

a control comprising an image processor for processing image data captured by the plurality of vehicle cameras and image data captured by the trailer rear camera;

a display device disposed in the vehicle and operable to display video images at a display screen that is viewable by a driver of the vehicle;

wherein the control, with the trailer hitched at the hitch of the vehicle, generates a three dimensional model of the trailer that is representative of length, width and height of the trailer, and wherein the control generates the three dimensional model of the trailer based at least in part responsive to processing of image data captured by the plurality of vehicle cameras;

wherein the control, with the trailer hitched at the hitch of the vehicle, and responsive to actuation of a user actuatable input, displays a surround view image using a vehicle avatar of the vehicle and a trailer avatar of the trailer derived from the three dimensional model of the trailer, and wherein three dimensions of the trailer avatar are visible when displayed, and wherein the visible three dimensions of the trailer avatar represent length, width, and height of the trailer, and wherein three dimensions of the vehicle avatar are visible when displayed, and wherein the three visible dimensions of the vehicle avatar represent length, width, and height of the vehicle;

wherein the control, with the trailer hitched at the hitch of the vehicle, and responsive to actuation of the user actuatable input, displays transparent trailer view video images derived from image data captured by a rearward viewing vehicle camera and the trailer rear camera, and wherein the control, when displaying the transparent trailer view video images, overlays at least a portion of images derived from image data captured by the trailer rear camera over a first portion of images derived from image data captured by the vehicle rear backup camera to provide transparent trailer views, and wherein a second portion of the images derived from image data captured by the rearward viewing camera is not overlayed by the at least a portion of images derived from image data captured by the trailer rear camera, and wherein the second portion of the images derived from image data captured by the rearward viewing vehicle camera that are not overlayed by the at least a portion of images derived from image data captured by the trailer rear camera include a portion of the trailer in the images derived from image data captured by the rearward viewing vehicle camera, and wherein the display device displays the transparent trailer view video images based on the provided transparent trailer views; and wherein, with the trailer hitched at the hitch of the vehicle, and responsive to the vehicle being shifted into a reverse gear, the display device automatically displays rear backup images derived from image data captured by the trailer rear camera.

18. The vehicular trailering assist system of claim 17, comprising a plurality of trailer cameras disposed at the trailer, wherein the plurality of trailer cameras includes the trailer rear camera and at least one trailer side camera mounted at each side of the trailer and viewing at least sideward of the trailer.

19. The vehicular trailering assist system of claim 18, wherein the displayed transparent trailer view images are derived from image data captured by at least one of the trailer side cameras.

20. The vehicular trailering assist system of claim 17, wherein, with the trailer hitched at the hitch of the vehicle, the trailer avatar has a color derived from determination of the color of the trailer via processing of image data captured by at least some of the plurality of vehicle cameras disposed at the vehicle.

21. The vehicular trailering assist system of claim 17, wherein, with the trailer hitched at the hitch of the vehicle, and responsive to determining that the trailer is hitched to the vehicle for the first time, the control generates the three dimensional model during a calibration drive.

22. The vehicular trailering assist system of claim 17, wherein the control stores the generated three dimensional model of the trailer that is currently hitched to the hitch of the vehicle for use in future events where that trailer is hitched to the hitch of the vehicle.

* * * * *